United States Patent [19]

Tyneski et al.

[11] Patent Number: 5,584,054
[45] Date of Patent: Dec. 10, 1996

[54] COMMUNICATION DEVICE HAVING A MOVABLE FRONT COVER FOR EXPOSING A TOUCH SENSITIVE DISPLAY

[75] Inventors: Frank M. Tyneski; Mac W. Branan, Jr., both of Fort Lauderdale, Fla.

[73] Assignee: Motorola, Inc., Schaumburg, Ill.

[21] Appl. No.: 276,374

[22] Filed: Jul. 18, 1994

[51] Int. Cl.6 .............................. H04B 1/40; H04Q 7/32
[52] U.S. Cl. ........................... 455/89; 455/90; 379/58; 379/61
[58] Field of Search ............... 455/89, 90; 379/58, 379/61, 110, 434; 341/22, 34

[56] References Cited

U.S. PATENT DOCUMENTS

| | | | |
|---|---|---|---|
| 4,653,086 | 3/1987 | Laube | 379/96 |
| 5,151,946 | 9/1992 | Martensson | 379/38 |
| 5,175,759 | 12/1992 | Metroka et al. | 379/58 |
| 5,283,862 | 2/1994 | Lund | 395/155 |
| 5,335,276 | 8/1994 | Thompson et al. | 380/21 |
| 5,337,346 | 8/1994 | Uchikura | 379/61 |
| 5,363,089 | 11/1994 | Goldenberg | 340/825.44 |
| 5,436,954 | 7/1995 | Nishiyama et al. | 379/58 |

FOREIGN PATENT DOCUMENTS

| | | | |
|---|---|---|---|
| 3-104432 | 5/1991 | Japan | 455/89 |
| 6-164440 | 6/1994 | Japan | 455/89 |

OTHER PUBLICATIONS

PEN (Personal Electronics News), Issue 13, Jul./Aug. 1993, pp. 1 and 7.
Simon™ Mobile Communications Made Simple brochure, from BellSouth Corp., 1994.
An Overview of Apple Products for Business Brochure.

*Primary Examiner*—Chi H. Pham
*Attorney, Agent, or Firm*—John G. Rauch; Barbara R. Doutre

[57] ABSTRACT

A handset (100) has first and second modes of operation controlled by a moveable flap (104). The first mode of operation provides two way voice communication when the moveable flap (104) is in a closed position. The second mode of operation provides a personal organizer when the flap (104) is in a open position.

20 Claims, 2 Drawing Sheets

COMMUNICATION DEVICE HAVING A MOVABLE FRONT COVER FOR EXPOSING A TOUCH SENSITIVE DISPLAY

TECHNICAL FIELD

This invention relates to communication devices, and more specifically to portable communication devices.

BACKGROUND

With the ever increasing popularity of portable electronic devices, such as cordless telephones and personal organizers, a higher priority is being placed upon designing these devices in lightweight and compact forms that are readily portable. While a user may enjoy the portability of these devices, he may still require carrying several devices at the same time in order to have two way voice communication and data communication at his disposal. Having to carry separate devices for a cordless telephone and personal organizer can be cumbersome for the user. Furthermore, these devices typically require separate chargers, and the disarray often associated with having multiple devices having multiple chargers can become quite inconvenient to the user. Hence, there is a need for a portable communication device that incorporates two way voice and data communication.

DETAILED DESCRIPTION OF THE PREFERRED EMBODIMENT

Figure 1:
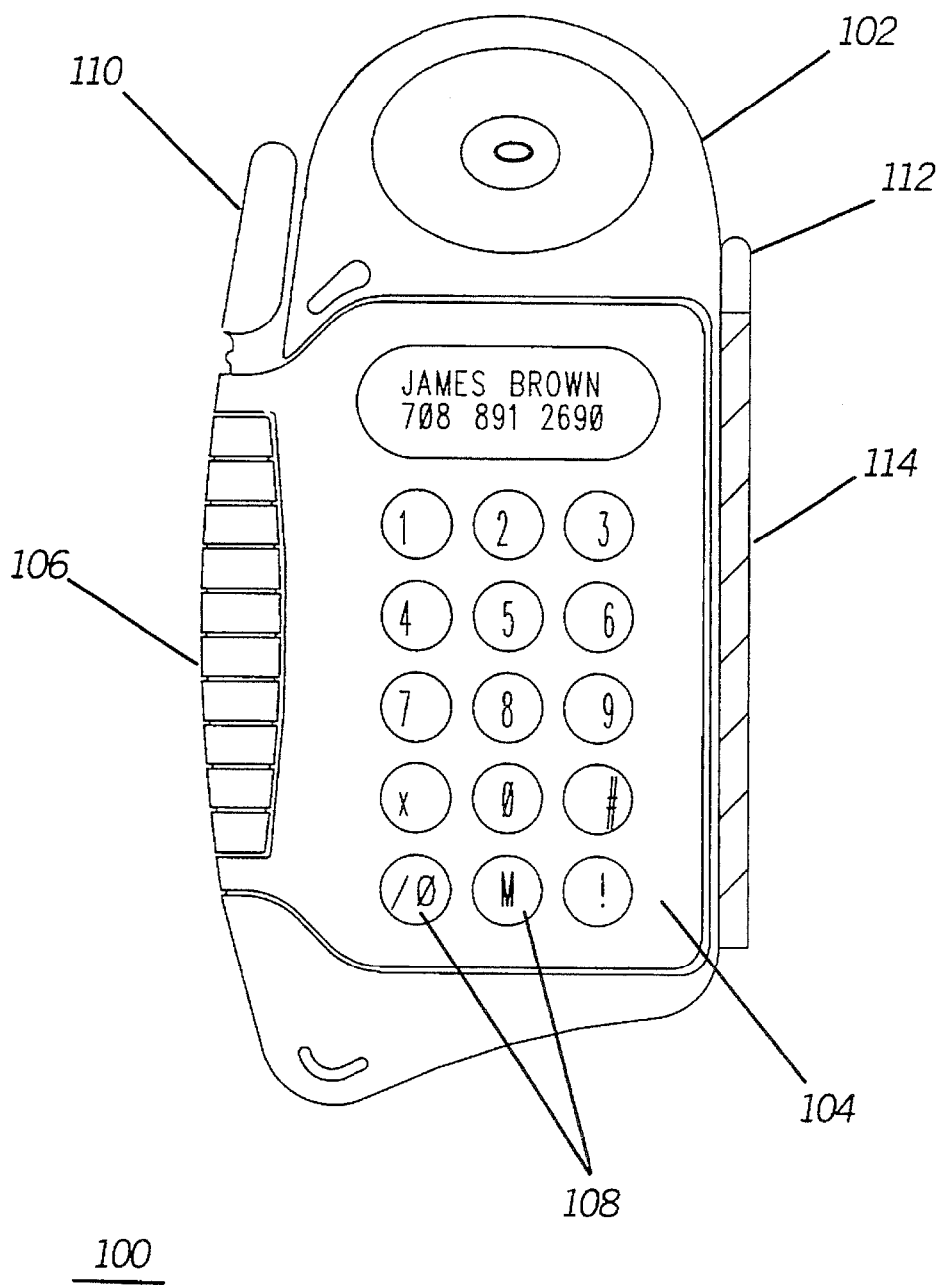
FIG. 1 is a drawing illustrating a communication device in accordance with the present invention.

FIG. 1 of the accompanying drawings depicts a portable radio, or handset, 100 in accordance with the present invention. The handset 100 to be described herein provides two way voice communication along with a personal organizer. In the preferred embodiment the handset 100 is a second generation cordless telephone (CT2) handset, however other communication devices, such as cellular telephones, could also employ this invention. The handset 100 includes a housing 102 and a flap, or front cover, 104 coupled to the housing through a hinge 106. A plurality of keys are included within the flap 104 to provide dialing capability, menu scrolling, and other similar functions associated with cordless telephones. An antenna 110 is also included within the handset 100 as a means for transmitting and receiving a radio frequency signal. In the preferred embodiment of the invention, the plurality of keys 108 are included as part of a keypad membrane, sandwiched between two pieces of plastic to form the flap 104. Other materials, such as a single piece of rubber, could also be used to form the flap 104 including the keys 108. Also included in the flap 104 is a display window for displaying scrolled menus and information generated with key presses to the keys 108. Pressure surfaces (to be shown in FIG. 2) located on the back of each key travel a predetermined distance when the key is pressed such that contact to a touch sensitive screen (to be shown later) is made without damaging the screen.

Included within the hinge 106 is a sensor switch for detecting movement by the flap 104 between a first, or open, position and a second, or closed, position. In the preferred embodiment of the invention, the handset 100 operates as a CT2 phone when the flap is in the closed position, and the user can use the front keypad for typical CT2 phone functions. When the flap is opened, the sensor switch within the hinge 106 sends a signal to a controller section located within the housing 100 to indicate that the handset is to switch over to function as a personal organizer as well known in the art.

Figure 2:
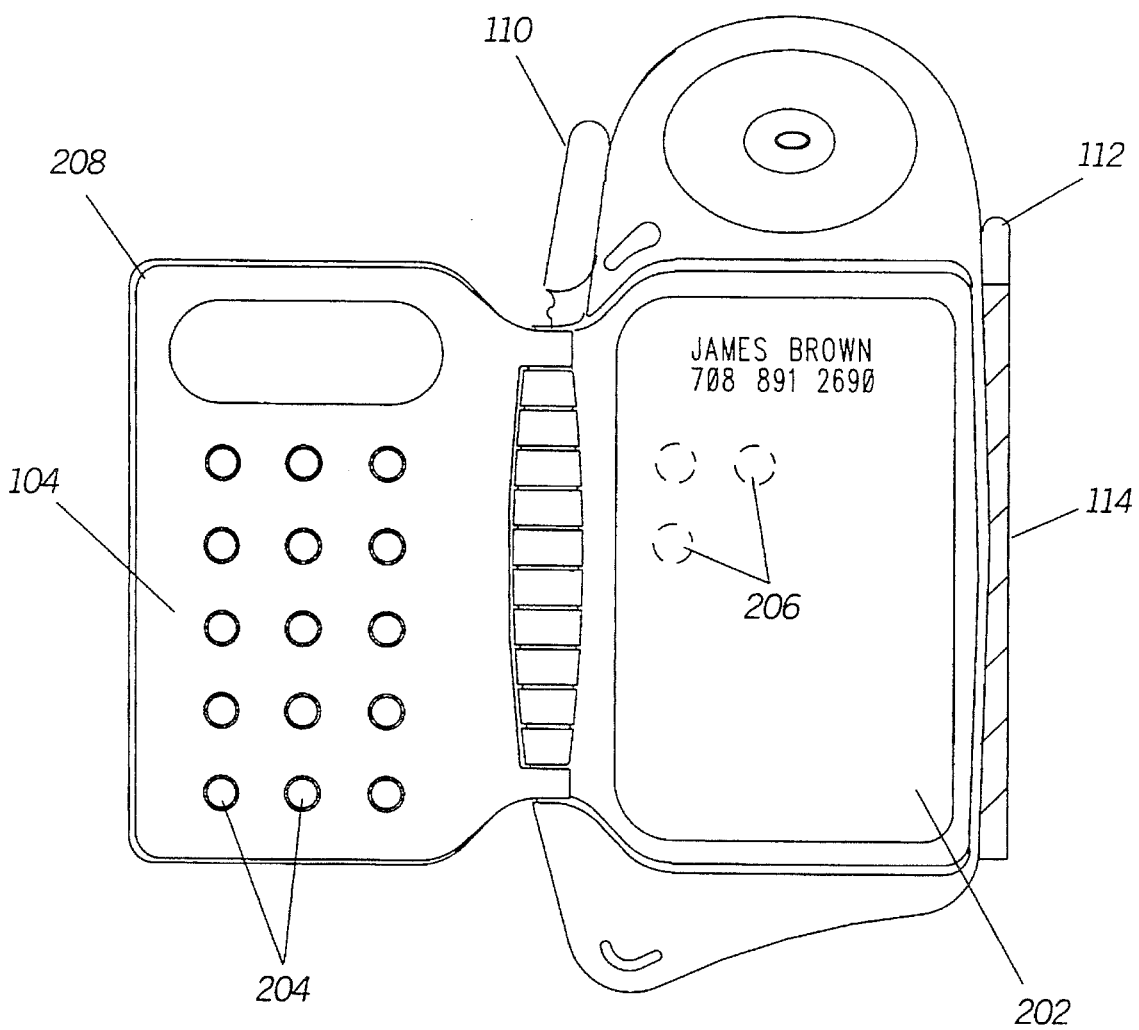
FIG. 2 is a second drawing illustrating the communication device in accordance with the present invention.

Referring now to FIG. 2, the handset 100 is shown with the flap 104 in the open position. By opening the flap 104, the switch located within the hinge 106, senses the change in the flap position and sends a signal to the controller section which enables a display, or lens, 202 coupled to the housing 102, to function as the personal organizer. With the flap 104 in the open position exposing the full display 202, the user has access to a full writing table, provided by the display 202, upon which to write notes, store messages, sketches, as well as other data operations. The display 202 is preferably a touch sensitive liquid crystal display (LCD) that reacts to a minimum amount of pressure. The display 202 may use touch sensitive film or other similar means for receiving data entry. Data is transferred to the display 202 through the form of key presses when the flap 104 is closed or handwritten data when the flap is opened. A stylus 112, preferably located in a retaining sleeve 114 on the side of the handset 100, may be removed and used as a writing tool for sending handwritten data to the display 202 when the flap 104 is closed.

Also shown in FIG. 2, are the pressure surfaces 204 located on the inside of flap 104. When a key 108 is actuated from the front side with the flap 104 closed, pressure is applied via the pressure surfaces 204 to preferably a touch sensitive activation area 206 corresponding to each key within the display 202. Each pressure surface 204 aligns with a corresponding activation area 206 when the flap 104 is in the closed position. With each key press initiated by the user, the pressure surface 204 travels a predetermined distance to make contact to the corresponding activation area 206. These activation areas 206 are shown only for the purpose of describing the function of the keys when the flap 104 is closed. When the user opens the flap 104, the activation areas 206 no longer function as a keypad. Also included on the inside flap 104 is a bumper 208, preferably manufactured of rubber material, that sets the keys 108 and their associated pressure surfaces 204 a predetermined distance away from the surface of the lens 202 when the flap 104 is in the closed position. The bumper 208 helps prevent false key presses and also helps protect the lens 202 against breakage and scratches.

While the handset 100 is operating as a personal organizer when the flap 104 is in the open position, signaling information can still be received with antenna 110, and the user can be alerted to an incoming call. The user may then close the flap 104 and use the handset as a cordless telephone to answer the call.

The handset as described by the invention provides for two modes of operation by combining two way voice communication along with a personal organizer. By combining a cordless handset and personal organizer, the number of electronic devices a user must carry is reduced. The handset as described by the invention could also be charged from a single charger thus eliminating the need for multiple chargers. The cover or flap, when in the closed position, provides increased protection to the lens against breakage and dirt.

While the preferred embodiments of the invention have been illustrated and described, it will be clear that the invention is not so limited. Numerous modifications, changes, variations, substitutions, and equivalents will occur to those skilled in the art without departing from the spirit and scope of the present invention as defined by the appended claims.

What is claimed is:

1. A portable communication device comprising:

a housing having a front surface;

a front cover coupled to the housing by a hinge, the front cover being moveable between an open position and a closed position, the front cover having an inner surface and an outer surface, the front cover including a plurality of keys on the outer surface of the front cover and a corresponding plurality of pressure surfaces on the inner surface, the inner surface of the front cover and the plurality of pressure surfaces being located adjacent the front surface of the housing when the front cover is in the closed position, each respective pressure surface traveling a predetermined distance from the inner surface of the front cover in response to a key press of a corresponding respective key of the plurality of keys; and a display screen located on the front surface of the housing, the display screen including a touch sensitive screen operative when the front cover is in the open position for receiving handwritten data for display on the display screen in response to pressure applied to the touch sensitive screen, the display screen including a plurality of touch sensitive activation areas, each respective touch sensitive activation area aligning with a corresponding respective pressure surface when the front cover is in the closed position, each respective pressure surface making contact with the corresponding respective activation area in response to the key press of the corresponding respective key of the plurality of keys for transferring data to the display screen when the front cover is in the closed position.

2. A portable communication device as described in claim 1, further comprising a stylus for entering the handwritten data onto the display screen when the front cover is in the open position.

3. A portable communication device as described in claim 1, wherein the portable communication device operates as a radiotelephone when the front cover is in the closed position and the portable communication device operates as a personal organizer when the front cover is in the open position.

4. A portable communication device as described in claim 3, further comprising a means for receiving signaling information when the front cover is in the open position.

5. A portable communication device as described in claim 2 wherein the housing includes a retaining sleeve for storing the stylus.

6. A portable communication device as described in claim 4 wherein the means for receiving signaling information comprises an antenna coupled to the housing.

7. A portable communication device as recited in claim 1 wherein the front cover includes an aperture forming a display window adjacent to the plurality of keys, the aperture displaying a portion of the display screen adjacent to the plurality of touch sensitive activation areas when the front cover is in the closed position.

8. A portable communication device as recited in claim 1 wherein the portable communication device further comprises:

a controller located within the housing for controlling operation of the portable communication device; and a sensor switch coupled to the controller, the sensor switch detecting the open position of the front cover, the sensor switch providing to the controller a signal indicative of the open position of the front cover, the controller controlling operation of the portable communication device as a personal organizer in response to the signal indicative of the open position of the front cover.

9. A communication device configured for receiving radio frequency communication, the communication device comprising:

a housing having a front surface, a left side, a right side, a top and a bottom;

a display located on the front surface of the housing, the display including a plurality of touch sensitive activation areas;

a hinge coupled to the left side of the housing;

a front cover coupled to the hinge and movable between an open position and a closed position, the front cover including a plurality of keys, each key having a respective pressure surface, each respective pressure surface aligning with a corresponding touch sensitive activation area when the front cover is in the closed position, each key traveling a predetermined distance to make contact with the corresponding touch sensitive activation area in response to a key press of the key;

an antenna coupled to the housing; and a stylus detachably coupled to the right side of the housing.

10. A communication device as described in claim 9 wherein the front cover further comprises a body having an aperture forming a display window, and wherein the display includes a first area and a second area, the first area including the plurality of touch sensitive activation areas, and wherein the second area is visible through the aperture when the front cover is in the closed position.

11. A communication device as described in claim 10 wherein the front cover comprises a keypad membrane sandwiched between two plastic elements to form the body, the keypad membrane including the plurality of keys.

12. A communication device as described in claim 11 wherein the front cover has an inner surface and an outer surface and wherein the front cover further comprises a bumper on the inner surface, the bumper spacing each respective pressure surface a predetermined distance from the display when the front cover is in the front position.

13. A communication device as described in claim 9 wherein the communication device further comprises a retaining sleeve at the right side of the housing for storing the stylus.

14. A communication device as recited in claim 9 wherein the communication device further comprises:

a controller located within the housing for controlling operation of the communication device; and a sensor switch coupled to the controller, the sensor switch detecting the open position of the front cover, the sensor switch providing to the controller a signal indicative of the open position of the front cover, the controller controlling operation of the communication device as a personal organizer in response to the signal indicative of the open position of the front cover.

15. A communication device as recited in claim 14 wherein the controller controls operation of the communication device as a radiotelephone in the absence of the signal indicative of the open position of the front cover.

16. A communication device as recited in claim 9 wherein the display comprises a touch sensitive liquid crystal display.

17. A radiotelephone handset having a front cover coupled to a housing, the housing including a touch sensitive display, the front cover being movable between an open position and a closed position, the front cover including a plurality of keys, each key having a pressure surface located adjacent the display when the front cover is in the closed position, each key being movable in response to a key press for moving the pressure surface a predetermined distance to make contact with the display when the front cover is in the closed position.

18. A radiotelephone handset as described in claim 17 wherein data is transferred to the display in response to the key press when the front cover is in the closed position.

19. A radiotelephone handset as described in claim 18 wherein the radiotelephone handset further comprises a detachable stylus, the stylus configured for engaging the display as a writing tool when the front cover is in the open position, and wherein handwritten data is transferred to the display in response to engagement of the display by the stylus.

20. A radiotelephone handset as recited in claim 19 wherein the radiotelephone handset further comprises a controller located within the housing and a sensor switch coupled to the controller, the sensor switch detecting the open position of the front cover, the sensor switch providing to the controller a signal indicative of the open position of the front cover, the controller controlling operation of the radiotelephone handset as a personal organizer in response to the signal indicative of the open position of the front cover.

* * * * *